US012588676B2

(12) United States Patent
Bevinakatti et al.

(10) Patent No.: US 12,588,676 B2
(45) Date of Patent: Mar. 31, 2026

(54) EPOXIDIZED OIL-BASED SURFACTANT AND COMPOSITIONS COMPRISING THE SAME

(71) Applicant: NOURYON CHEMICALS INTERNATIONAL B.V., Arnhem (NL)

(72) Inventors: Hanamanthsa Bevinakatti, Somerset, NJ (US); Qingwen Wendy Yuan-Huffman, Belle Mead, NJ (US); Shawn Zhu, Stormville, NY (US); Mojahedul Islam, Whitehouse Station, NJ (US)

(73) Assignee: NOURYON CHEMICALS INTERNATIONAL B.V., Arnhem (NL)

( * ) Notice: Subject to any disclaimer, the term of this patent is extended or adjusted under 35 U.S.C. 154(b) by 887 days.

(21) Appl. No.: 17/757,027

(22) PCT Filed: Dec. 14, 2020

(86) PCT No.: PCT/EP2020/086055
§ 371 (c)(1),
(2) Date: Jun. 8, 2022

(87) PCT Pub. No.: WO2021/116500
PCT Pub. Date: Jun. 17, 2021

(65) Prior Publication Data

US 2023/0036093 A1 Feb. 2, 2023

Related U.S. Application Data

(60) Provisional application No. 62/947,868, filed on Dec. 13, 2019.

(51) Int. Cl.
*A01N 43/20* (2006.01)
*A01N 37/38* (2006.01)
(Continued)

(52) U.S. Cl.
CPC ............ *A01N 43/20* (2013.01); *A01N 37/38* (2013.01); *A01N 37/40* (2013.01); *A01N 57/20* (2013.01); *A01P 13/00* (2021.08)

(58) Field of Classification Search
CPC ........ A01N 43/20; A01N 37/38; A01N 37/40; A01N 57/20; A01P 13/00
See application file for complete search history.

(56) References Cited

U.S. PATENT DOCUMENTS 6,004,923 A * 12/1999 Oftring ................ C07C 229/22
510/499

FOREIGN PATENT DOCUMENTS

CN 102099420 A 6/2011
CN 106810514 A 6/2017
(Continued)

OTHER PUBLICATIONS

Tanrattanakul et al (eXPRESS Polymer Letters vol. 7, No. 11 (2013) 910-924). (Year: 2013).*
(Continued)

*Primary Examiner* — Jiangtian Xu
(74) *Attorney, Agent, or Firm* — Ingrassia, Fisher & Lorenz, LLP

(57) ABSTRACT

An epoxidized oil-based surfactant is the reaction product of an epoxidized compound and a primary and/or secondary alkanolamine, wherein the epoxidized compound is chosen from an epoxidized oil, an epoxidized fatty acid, an epoxidized fatty acid ester, and combinations thereof. An herbicidal composition includes glyphosate or a salt thereof and at least one epoxidized oil-based surfactant. The herbicidal composition is used in a method of controlling unwanted vegetation wherein the method includes the step of applying to the unwanted vegetation a herbicidally effective amount of the aforementioned herbicidal composition. The epoxi-
(Continued)

dized oil-based surfactant is prepared using a method that includes reacting the epoxidized compound and the primary and/or secondary alkanolamine. The epoxidized oil-based surfactant is also utilized in a cleaning composition for the cleaning of hard surfaces, wherein the cleaning composition includes the epoxidized oil-based surfactant and an additional component chosen from an additional surfactant and/or a chelating agent.

18 Claims, 2 Drawing Sheets

(51) Int. Cl.

| | |
|---|---|
| ***A01N 37/40*** | (2006.01) |
| ***A01N 57/20*** | (2006.01) |
| ***A01P 13/00*** | (2006.01) |

(56) References Cited

FOREIGN PATENT DOCUMENTS

| | | | |
|---|---|---|---|
| DE | 2734596 | A1 | 2/1979 |
| FR | 1349807 | A | 1/1964 |
| WO | 9716408 | A1 | 5/1997 |

OTHER PUBLICATIONS

Gao Xiuping, Study on preparation of polyhydroxyl oil from epoxy soybean oil, Aug. 25, 2013, Issue: No. 4, China Cotton Processing.

* cited by examiner

EPOXIDIZED OIL-BASED SURFACTANT AND COMPOSITIONS COMPRISING THE SAME

CROSS-REFERENCE TO RELATED APPLICATION

This application is a U.S. National-Stage entry under 35 U.S.C. § 371 based on International Application No. PCT/EP2020/086055, filed Dec. 14, 2020 which was published under PCT Article 21(2) and which claims the benefit of U.S. Provisional Application No. 62/947,868, filed Dec. 13, 2019, which are all hereby incorporated in their entirety by reference.

FIELD OF THE DISCLOSURE

The present disclosure generally relates to an epoxidized oil-based surfactant and compositions including that surfactant. The epoxidized oil-based surfactant is the reaction product of an epoxidized compound and a primary and/or secondary alkanolamine. The compositions that include the surfactant may be herbicidal compositions, cleaning compositions, or the like.

BACKGROUND

N-phosphonomethylglycine, otherwise known as glyphosate, is well known in the art as an effective post-emergent foliar applied herbicide. Glyphosate is an organic compound with three acidic groups and in its acid form is relatively insoluble in water. Glyphosate is, therefore, normally formulated and applied as a water-soluble salt. Although typically monobasic, it is known that dibasic and tribasic salts of glyphosate are also made. It has generally been typical to formulate and apply glyphosate in the form of a monobasic salt, for example as a mono-(organic ammonium) salt such as the mono (isopropylamine) salt, often abbreviated to "IPA salt."

Glyphosate salts generally require the presence of a suitable surfactant to improve bioefficacy and enhance overall herbicidal performance. The surfactant may be provided in a concentrate formulation or may be added by the end user to a diluted spray solution. The choice of surfactant is very important since there are wide variations among surfactants in their ability to enhance the herbicidal efficacy of glyphosate, and there are a large number of surfactants that will not aid in solubilizing and improving the adjuvancy of herbicides, particularly herbicide salts.

The herbicidal efficacy of glyphosate salt solutions is highly dependent upon two factors: selecting a suitable surfactant and providing an effective (as high a concentration as possible) amount of that surfactant in the concentrate formulation. Glyphosate itself is mild to the eyes, has low aquatic toxicity, and is readily biodegradable. Alkylamine based surfactants have been used and have provided excellent bioefficacy enhancing ability to glyphosate. These surfactants may, under certain conditions, exhibit higher eye irritation potential than various other surfactants, but are nonetheless suitable and safe for use. However, alternatives to alkylamine based surfactants having lower eye irritation properties and lower toxicity to aquatic life would be advantageous in certain circumstances.

It is known to those skilled in the art that finding a suitable surfactant with good efficacy enhancing property for glyphosate is difficult. However, finding a suitable surfactant with low eye irritation and aquatic toxicity properties in addition to good efficacy enhancing property is even more difficult.

An important ingredient in many commercial glyphosate IPA formulations is tallowamine ethoxylate ("TAEO"). Such formulations show excellent bioefficacy. However, while such formulations have been approved for use by regulatory bodies around the world, concerns about their effects on humans, animals and the environment persist. Further, although commercial glyphosate salt/TAEO formulations show excellent bioefficacy, these formulations can be limited in the amount of loading that is possible in the formulation.

Accordingly, it is desirable to develop a suitable surfactant and compositions including the same.

BRIEF SUMMARY

The instant disclosure provides an epoxidized oil-based surfactant that is the reaction product of an epoxidized compound and a primary and/or secondary alkanolamine, wherein the epoxidized compound is chosen from an epoxidized oil, an epoxidized fatty acid, an epoxidized fatty acid ester, and combinations thereof.

This disclosure also provides an herbicidal composition comprising glyphosate or a salt thereof and at least one epoxidized oil-based surfactant as described above.

This disclosure further provides a method of controlling unwanted vegetation wherein the method includes the step of applying a herbicidally effective amount of the aforementioned herbicidal composition to the unwanted vegetation.

This disclosure even further provides a method of preparing the epoxidized oil-based surfactant including the step of reacting the epoxidized compound and a primary and/or secondary alkanolamine, wherein the epoxidized compound is chosen from an epoxidized oil, an epoxidized fatty acid, an epoxidized fatty acid ester, and combinations thereof.

This disclosure also provides a cleaning composition for the cleaning of hard surfaces, wherein the cleaning composition includes the aforementioned epoxidized oil-based surfactant and an additional component chosen from an additional surfactant and/or a chelating agent.

BRIEF DESCRIPTION OF THE DRAWINGS

The present disclosure will hereinafter be described in conjunction with the following drawing figures wherein.

DETAILED DESCRIPTION

Figure 1:
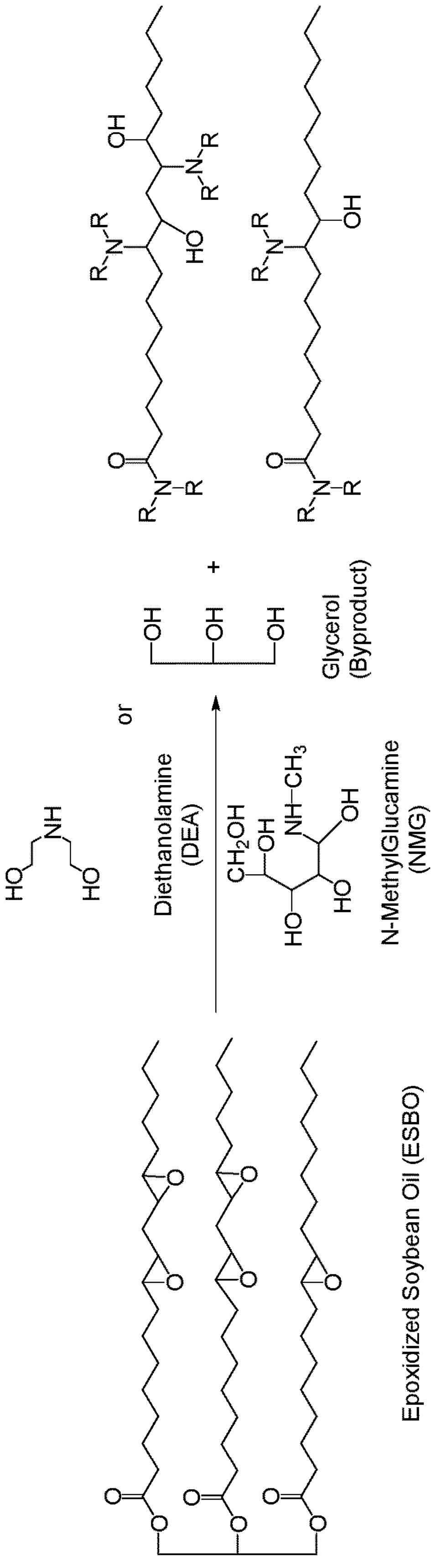
FIG. 1 is a reaction schematic of one embodiment of this disclosure.

The following detailed description is merely exemplary in nature and is not intended to limit the invention or the application and uses of the invention. Furthermore, there is no intention to be bound by any theory presented in the preceding background of the invention or the following detailed description. It is to be appreciated that all numerical values as provided herein, save for the actual examples, are approximate values with endpoints or particular values intended to be read as "about" or "approximately" the value as recited.

This disclosure provides an epoxidized oil-based surfactant that is the reaction product of an epoxidized compound and a primary and/or secondary alkanolamine, wherein the epoxidized compound is chosen from an epoxidized oil, an epoxidized fatty acid, an epoxidized fatty acid ester, and combinations thereof. The aforementioned surfactant can be utilized alone or in combination with one or more co-surfactants, as described in detail below. Moreover, the aforementioned surfactant can be utilized in a composition including, but not limited to, an herbicidal composition, a cleaning composition, etc., as also described in detail below. It is contemplated that wherever the term "formulation" is used herein, the word "composition" may be optionally used.

The epoxidized oil-based surfactant is the reaction product of an epoxidized compound and a primary and/or secondary alkanolamine. Compared to TAEO, the epoxidized oil-based surfactant is less toxic and exhibits bioefficacy of the same order.

In various embodiments, the aforementioned surfactant can be described having demonstrated the ability to enhance the bioefficacy of glyphosate formulations while at the same time providing the potential for both conventional and ultrahigh loadings of glyphosate and salts thereof yet having very low irritation to eyes and low toxicity to aquatic life.

The epoxidized oil-based surfactant that is the reaction product of an epoxidized compound and a primary and/or secondary alkanolamine, wherein the epoxidized compound is chosen from an epoxidized oil, an epoxidized fatty acid, an epoxidized fatty acid ester, and combinations thereof. The epoxidized oil, epoxidized fatty acid, and epoxidized fatty acid ester are not particularly limited and may be any known in the art. Alternatively, the epoxidized compound may be described as any vegetable oil having at least one epoxy group.

As further described in the Examples, there are up to 9 reaction sites for epoxidized soybean oil when reacting with an amine. However, when a different epoxidized oil such as epoxidized linseed oil is used, this number may be less. Accordingly, any and all ratios of reactants are hereby expressly contemplated for use herein so long as the total does not exceed the number of reaction sites of the epoxidized oil, as is understood by those of skill in the art.

Epoxidized Oil:

If the epoxidized compound is an epoxidized oil, then the epoxidized oil is not particularly limited and may be any known in the art. For example the epoxidized oil may be the reaction product of any oil having at least one carbon-carbon double bond, e.g. natural or synthetic, with an epoxidizing agent including, but not limited to, peroxides, peracids, and the like. Said a different way, the epoxidized oil itself may be formed from the reaction of any oil having at least one carbon-carbon double bond, e.g. natural or synthetic, with an epoxidizing agent including, but not limited to, peroxides, peracids, and the like.

In various embodiments, the oil used to form the epoxidized oil is chosen from vegetable oils including, but not limited to, avocado oil, Brazil nut oil, canola oil, coconut oil, corn oil, cottonseed oil, flaxseed/linseed oil, grapeseed oil, hempseed oil, olive oil, palm oil, peanut oil, safflower oil, soybean oil, sunflower oil, or combinations thereof. In one embodiment, the oil used to form the epoxidized oil is soybean oil.

The epoxidized oil itself is also not particularly limited. In one embodiment, the epoxidized oil is described as a reaction product of a vegetable oil having at least one carbon-carbon double bond and a peroxide and/or peracid. In other embodiments, the epoxidized oil is a naturally occurring epoxidized oil such as *Vernonia* oil.

In one embodiment, the epoxidized oil is epoxidized soybean oil having the structure (I):

(I)

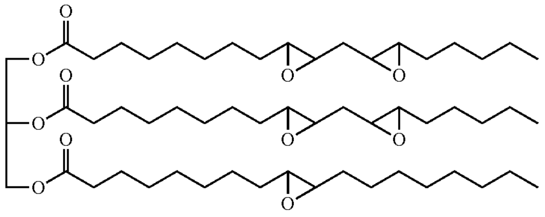

In another embodiment, the epoxidized oil is epoxidized soybean oil having the structure (II):

(II)

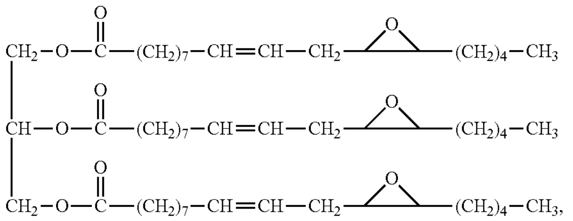

which is commonly known as *Vernonia* oil.

In another embodiment, the epoxidized oil is the reaction product of a vegetable oil having at least one carbon-carbon double bond and a peroxide and/or peracid.

Epoxidized Fatty Acid and Epoxidized Fatty Acid:

If the epoxidized compound is or includes the epoxidized fatty acid, then this compound is also not particularly limited and may be any known in the art. In various embodiments, the epoxidized fatty acid may be chosen from epoxidized methyl oleate, epoxidized methyl linoleate, epoxidized methyl linoleate, or combinations thereof. These compounds may be formed by any synthetic scheme known in the art.

If the epoxidized compound is or includes the epoxidized fatty acid ester, then this compound is also not particularly limited and may be any known in the art. In various embodiments, the epoxidized fatty acid ester may be chosen from epoxidized glycerol esters such as epoxidized glycerol monoleate or epoxidized glycerol dioleate, epoxidized glycol esters such as epoxidized propylene glycol monooleate or epoxidized propylene glycol dioleate, or combinations thereof, or combinations of any two or more of the aforementioned compounds.

Primary and/or Secondary Alkanolamine

Referring now to the primary and/or secondary alkanolamine, one or more of these compounds may be reacted with one or more of the aforementioned epoxidized compounds to form the surfactant. These reactions may occur by any known synthetic scheme including any amounts of reactants, and any temperature, time, and pressure, as would be chosen by one of skill in the art.

Typically, the primary and/or secondary alkanolamine is reacted with one or more of the epoxidized compounds in an amount of 1 molar equivalent of the primary and/or secondary alkanolamine to each molar equivalent of the epoxy unit on the epoxidized compound. Sometimes excess primary and/or secondary alkanolamine may be used so that all epoxy units are reacted. Apart from epoxy group, the primary and/or secondary alkanolamine also typically reacts with the ester groups, as described throughout this disclosure.

The particular primary and/or secondary alkanolamine chosen for use is not particularly limited and may be any known in the art. In various embodiments, the primary and/or secondary alkanolamine may be aminomethanol (also known as methanolamine), ethanolamine, propanolamine, combinations thereof, and the like. In other embodiments, the primary and/or secondary alkanolamine is chosen from ethanolamines, aminomethyl propanol, heptaminol, isoetarine, propanolamines (i.e., amino alcohols that are derivatives of 1-amino-2-propanol), sphingosine, methanolamine, dimethylethanolamine, N-methylethanolamine, N-methylglucamine, N-alkylglucamine, and combinations thereof. The alkanol moiety of the aforementioned alkanolamines may be any known in the art and may include 1, 2, 3, 4, 5, 6, 7, 8, 9, 10, 11, 12, 13, 14, 15, or 16, carbon atoms. Moreover, two alkanol moieties may be utilized wherein each moiety independently has 1, 2, 3, 4, 5, 6, 7, 8, 9, 10, 11, 12, 13, 14, 15, or 16, carbon atoms. The alkanol moieties may be linear, branched, or cyclic, or include one or more segments that are linear, branched, or cyclic. It is contemplated that the alkanol moieties may include one or more aromatic portions. In various non-limiting embodiments, it is expressly contemplated herein that all values and ranges of values, both whole and fractional, including and between each value described above can be utilized.

Figure 2:
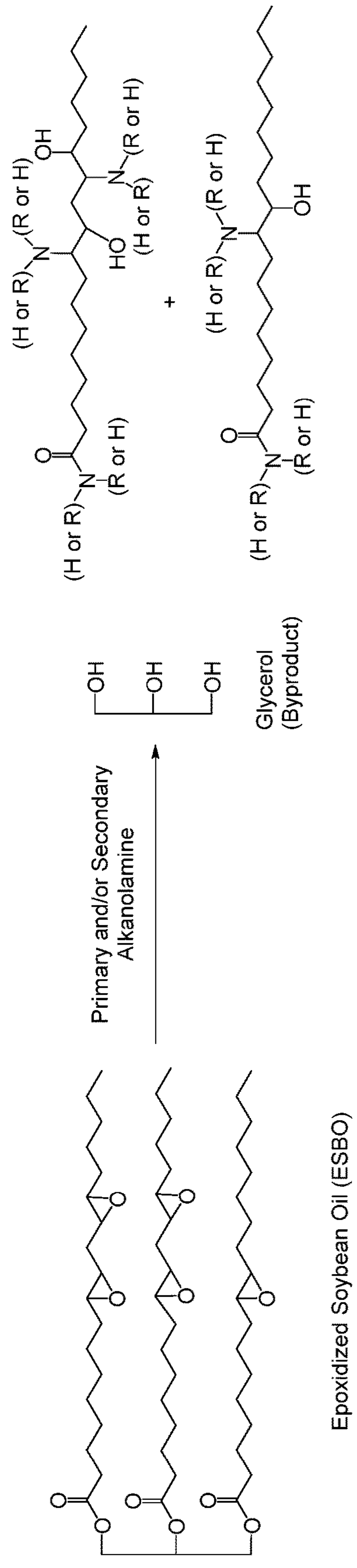
FIG. 2 is a reaction schematic of an additional embodiment of this disclosure.
Figure 3:
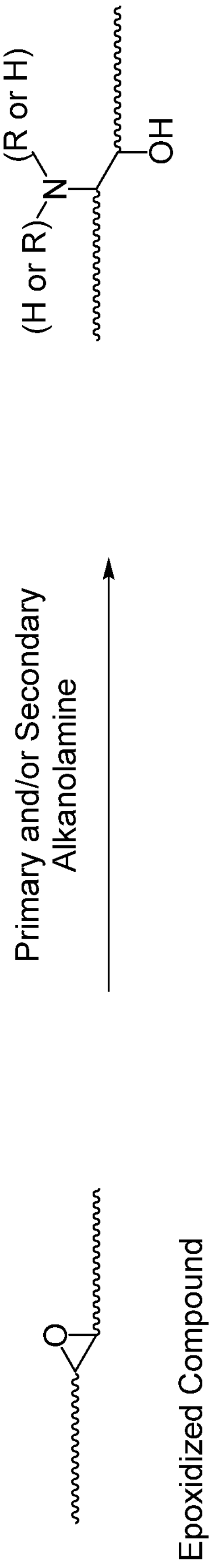
FIG. 3 is a reaction schematic of a further embodiment of this disclosure.

In one embodiment, the alkanolamine comprises or is diethanolamine and/or n-methylglucamine, or combinations thereof. For example, the reaction scheme may be as follows in various non-limiting embodiments as set forth in FIGS. 1, 2, and 3, wherein each R may independently be a hydrogen atom, an alkyl group having 1 to 50 carbon atoms, an alkanol group having 1 to 50 carbon atoms, or an ether-alkanol group having 1 to 50 carbon atoms. For example, in various embodiments, the group having 1 to 50 carbon atoms may be further defined as having 1, 2, 3, 4, 5, 6, 7, 8, 9, 10, 11, 12, 13, 14, 15, 16, 17, 18, 19, 20 . . . up to 50 carbon atoms or, for example, 1 to 10, 2 to 8, 3 to 7, 4 to 6, 5 to 6, 10 to 12, 12 to 14, 14 to 16, 16 to 18, or 18 to 20, carbon atoms. In various non-limiting embodiments, it is expressly contemplated herein that all values and ranges of values, both whole and fractional, including and between each value described above can be utilized.

The reaction can be carried out in the presence or absence of solvents. Suitable solvents include polar protic solvents, such as methanol, ethanol, isopropanol, and glycols, such as ethylene glycol, monopropylene glycol, water and the like, as well as polar aprotic solvents, such as dimethylformamide, tetrahydrofuran, ethyl acetate, amidopropylamine, acetonitrile, and the like. The progress of the reaction can be monitored, for example, with IR spectroscopy.

Epoxidized Oil-Based Surfactant:

The structure of the epoxidized oil-based surfactant is not particularly limited except that it is formed from the reaction of the epoxidized compound and the primary and/or secondary alkanolamine Therefore, one of skill in the art would appreciate and understand the structure of the epoxidized oil-based surfactant based on the choice of reactants, which may be any described above. Therefore, the structure of the epoxidized oil-based surfactant may be the result of the reaction of any of the aforementioned reactants.

In another embodiment, the epoxidized oil-based surfactant is, includes, consists essentially of, or consist of, a mixture of compounds having the structures:

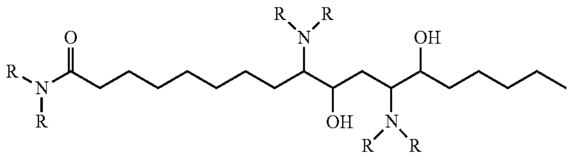

+

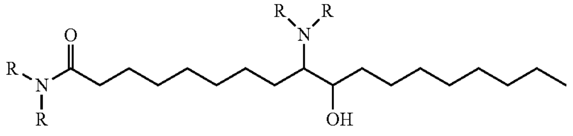

wherein each R may independently be a hydrogen atom, an alkyl group having 1 to 50 carbon atoms, an alkanol group having 1 to 50 carbon atoms, or an ether-alkanol group having 1 to 50 carbon atoms. For example, in various embodiments, the group having 1 to 50 carbon atoms may be further defined as having 1, 2, 3, 4, 5, 6, 7, 8, 9, 10, 11, 12, 13, 14, 15, 16, 17, 18, 19, 20 . . . up to 50 carbon atoms or, for example, 1 to 10, 2 to 8, 3 to 7, 4 to 6, 5 to 6, 10 to 12, 12 to 14, 14 to 16, 16 to 18, or 18 to 20, carbon atoms. In various non-limiting embodiments, it is expressly contemplated herein that all values and ranges of values, both whole and fractional, including and between each value described above can be utilized.

This disclosure also provides a method of preparing an epoxidized oil-based surfactant comprising the step of reacting an epoxidized oil and a primary and/or secondary alkanolamine. The reaction parameters including time, amounts of reactants, temperatures, pressures, etc. may be chosen by one of skill in the art.

Surfactant Composition:

This disclosure also provides a surfactant composition, i.e., a composition that includes the aforementioned epoxidized oil-based surfactant and another compound. For example, the other compound may be at least one co-surfactant different from the epoxidized oil-based surfactant. The co-surfactant may be any known in the art and is not particularly limited. For example, the co-surfactant may be any anionic, non-ionic, zwitterionic, or amphoteric surfactant or any combination or mixture thereof. Non-limiting examples are set forth throughout this disclosure. The amount of the co-surfactant may be any known in the art. For example, in various embodiments, the co-surfactant is utilized in an amount of from about 1 to about 50, about 5 to about 45, about 10 to about 40, about 15 to about 35, about 20 to about 30, or about 25 to about 30, weight percent actives based on a total weight of the surfactant composition. Similarly, the epoxidized oil-based surfactant may be independently utilized, with or without the co-surfactant, in an amount of from about 1 to about 99, about 5 to about 90, about 10 to about 85, about 15 to about 80, about 20 to about 75, about 25 to about 70, about 30 to about 65, about 35 to about 60, about 40 to about 55, or about 45 to about 50, weight percent actives based on a total weight of the surfactant composition. In various non-limiting embodiments, it is expressly contemplated herein that all values and ranges of values, both whole and fractional, including and between each value described above can be utilized.

Agrochemical Composition:

This disclosure also provides an agrochemical composition including an agrochemical, as is known in the art and the aforementioned surfactant and/or surfactant composition. This disclosure also provides a pesticide composition wherein the agrochemical is a pesticide. This disclosure also provides an herbicide composition wherein the agrochemical is an herbicide. This disclosure also provides a glyphosate composition wherein the herbicide is glyphosate. The aforementioned agrochemical, pesticide, herbicide, and glyphosate may be as any described herein or as known in the art.

Herbicidal Compositions

The present disclosure refers to and is applicable to all glyphosate salts including, but not limited to, "ammonium", "monoammonium" and "diammonium" salts of glyphosate. For example, the glyphosate salts useful in the present context include, but are not limited to salts of isopropylamine, monoethanolamine, diethanolamine, potassium, ammonium, trimesium, or mixtures thereof. Glyphosate rates and concentrations given herein, even where the glyphosate is present as a salt or salts, are expressed as acid equivalent (a.e.) unless the context demands otherwise.

In various embodiments, the present disclosure provides herbicidal formulations comprising at least one herbicidally active compound and the aforementioned epoxidized oil-based surfactant.

As used herein, the term "ultrahigh loading," as used herein, means a glyphosate or glyphosate salt loading of at least 540 g a.e./L.

As used herein, the term "conventional loading," as used herein, means a glyphosate or glyphosate salt loading of less than 540 g a.e./L.

Thus, in various embodiments, the herbicidally active compound employed in the formulations of the disclosure typically includes glyphosate. Glyphosate is an organic compound that at neutral pH includes three acidic protonable groups, and in its acid form is relatively insoluble in water. Therefore, glyphosate is normally formulated and applied as a water-soluble salt. Although monobasic, dibasic, and tribasic salts of glyphosate can be made, it has generally been typical to formulate and apply glyphosate in the form of a monobasic salt, for example as a mono-(organic ammonium) salt such as the mono (isopropylamine), often referred to as IPA, salt, or as either monobasic or dibasic ammonium (NH4) salt. Other suitable glyphosate salts include sodium (Na), potassium (K), monoethanolamine (MEA), diethanolamine (DEA), triethanolamine (TEA), trimesium (TMS), and mixtures thereof. In various embodiments, the glyphosate salt is chosen from sodium, potassium, ammonium, isopropylamine, monoethanolamine, diethanolamine, triethanolamine, trimesium salts, and mixtures thereof. In various other embodiments, the glyphosate salt is chosen from ammonium glyphosate, diammonium glyphosate, sodium glyphosate, potassium glyphosate, isopropylammonium glyphosate, and the monoethanolamine salt of glyphosate.

Compared to TAEO, the epoxidized oil-based surfactant is less toxic and exhibits bioefficacy of the same order, but has demonstrated potential to permit stable ultrahigh glyphosate and glyphosate salt loadings of 540 g a.e./L or higher, although lower loadings remain possible if desired.

The herbicidal formulations of the present disclosure can, in addition to aforementioned surfactant, include additional components including, but not limited to, additional surfactants or other additives. It is typical that when the formulations of the disclosure do include such additional components, that such additional components are likewise substantially non-irritating to the eye, substantially non-toxic to aquatic life, and have acceptable bioefficacy. Herbicidal formulations of the present disclosures may be in the form of liquid concentrates, solid concentrates, or a "ready-to-use" (i.e., RTU) composition prepared by diluting an aqueous concentrate or dissolving a solid composition.

In one embodiment, the herbicidal composition includes glyphosate or a salt thereof and at least one epoxidized oil-based surfactant.

In one embodiment, the at least one epoxidized oil-based surfactant is the only surfactant(s) in the herbicidal composition.

In another embodiment, in addition to the at least one epoxidized oil-based surfactant, the herbicidal composition additionally includes at least one co-surfactant that is different from the epoxidized oil-based surfactant.

Co-Surfactants

Where co-surfactants are present in the herbicidal composition and/or in the aforementioned surfactant composition, these can be cationic, anionic, nonionic, and/or amphoteric surfactants.

Non-limiting examples of typical cationic surfactants are alkoxylated alkylamine and its quaternary derivative, alkoxylated etheramine and its quaternary derivative, alkoxylated alkyl amines and oxides, alkoxylated alkyl etheramines and oxides, alkyl amidopropyl amines and oxide, alkyl trimethyl ammonium chloride, and alkyl (typically C6 to C10) dimethylamidopropylamine.

Non-limiting examples of typical anionic surfactants are alkylsulfate, alkylethersulfate, alkylsulfonate, alkylsulfosuccinate, alkoxylated phosphate ester, alkyl alpha olefin sulfonate, alkyl n-methyl taurate, fatty acid isethionate, and alkyl ether carboxylate.

Non-limiting examples of typical nonionic surfactants are alkoxylated mono and/or diglycerides, sorbitan ester and its alkoxylated derivative, sorbitol ester and its alkoxylated derivative, fatty acid ester, castor oil alkoxylate, alcohol alkoxylate, alkanolamide, alkanolamide alkoxylate, and alkyl polyglycoside.

Non-limiting examples of typical amphoteric surfactants are alkyl betaine, alkyl amidopropyl betaine, alkylamphoacetate, alkylamphodiacetate, alkylamphocarboxylate, alkylamphopropionate, alkylamphodipropionate, alkyl amidoamine carboxylate, alkylamphohydroxypropyl sulfonate, alkyl sultaine, alkyl amidopropyl hydroxyl sultaine, alkyl dihydroxyethyl glycinate, and alkyl aminopropionate.

In various embodiments, the weight ratio of epoxidized oil-based surfactant to total surfactant concentration of the herbicidal formulation is generally from about 1:9 to about 9:1, typically from about 1:6 to about 6:1 and, typically from about 1:4 to about 4:1 and, more typically, from about 1:2 to about 2:1. In various non-limiting embodiments, it is expressly contemplated herein that all values and ranges of values, both whole and fractional, including and between each value described above can be utilized.

One particularly typical co-surfactant is an amidoalkylamine surfactant, as described further below. In various embodiments, these amidoalkylamine surfactants have the general Structure:

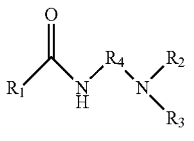

wherein R1 is a hydrocarbyl or substituted hydrocarbyl having from 1 to about 22 carbon atoms, R2 and R3 are each independently hydrocarbyl or substituted hydrocarbyl having from 1 to about 6 carbon atoms and R4 is hydrocarbylene or substituted hydrocarbylene having from 1 to about 6 carbon atoms. In various non-limiting embodiments, it is expressly contemplated herein that all values and ranges of values including and between each value described above can be utilized.

R1 is typically an alkyl or substituted alkyl having an average value of carbon atoms between about 4 to about 20 carbon atoms, typically an average value between about 4 and about 18 carbon atoms, more typically an average value from about 4 to about 12 carbon atoms, more typically an average value from about 5 to about 12 carbon atoms, even more typically an average value from about 6 to about 12 carbon atoms, and still more typically an average value from about 6 to about 10 carbon atoms. The R1 alkyl group may be derived from a variety of sources that provide alkyl groups having from about 4 to about 18 carbon atoms, for example, the source may be butyric acid, valeric acid, caprylic acid, capric acid, coco (comprising mainly lauric acid), myristic acid (from, e.g., palm oil), soy (comprising mainly linoleic acid, oleic acid, and palmitic acid), or tallow (comprising mainly palmitic acid, oleic acid, and stearic acid). In some embodiments, the amidoalkylamine surfactant component may include a blend of amidoalkylamines having alkyl chains of various lengths from about 5 carbon atoms to about 12 carbon atoms. For example, depending upon the source of the R1 alkyl group, an amidoalkylamine surfactant component may include a blend of surfactants having R1 groups that are 5 carbon atoms in length, 6 carbon atoms in length, 7 carbon atoms in length, 8 carbon atoms in length, 9 carbon atoms in length, 10 carbon atoms in length, 11 carbon atoms in length, and 12 carbon atoms in length, longer carbon chains, and combinations thereof. In other embodiments, the amidoalkylamine surfactant component may include a blend of surfactants having R1 groups that are 5 carbon atoms in length, 6 carbon atoms in length, 7 carbon atoms in length, and 8 carbon atoms in length. In some alternative embodiments, the amidoalkylamine surfactant component may include a blend of surfactants having R1 groups that are 6 carbon atoms in length, 7 carbon atoms in length, 8 carbon atoms in length, 9 carbon atoms in length, and 10 carbon atoms in length. In other embodiments, the amidoalkylamine surfactant component may include a blend of surfactants having R1 groups that are 8 carbon atoms in length, 9 carbon atoms in length, 10 carbon atoms in length, 11 carbon atoms in length, and 12 carbon atoms in length. In various non-limiting embodiments, it is expressly contemplated herein that all values and ranges of values including and between each value described above can be utilized.

R2 and R3 are independently typically an alkyl or substituted alkyl having from 1 to about 4 carbon atoms. R2 and R3 are most typically independently an alkyl having from 1 to about 4 carbon atoms, and most typically methyl. R4 is typically an alkylene or substituted alkylene having from 1 to about 4 carbon atoms. R4 is most typically an alkylene having from 1 to about 4 carbon atoms, and most typically n-propylene. In various non-limiting embodiments, it is expressly contemplated herein that all values and ranges of values including and between each value described above can be utilized.

In one typical amidoalkylamine surfactant, R1 is C6-10, i.e., an alkyl group having 6 carbon atoms, 7 carbon atoms, 8 carbon atoms, 9 carbon atoms, 10 carbon atoms, or a blend of any of these, i.e., from about 6 carbon atoms to about 10 carbon atoms; R2 and R3 are each methyl; and R4 is n-propylene (i.e., C6-10 amidopropyl dimethylamine) In various non-limiting embodiments, it is expressly contemplated herein that all values and ranges of values including and between each value described above can be utilized.

When R4 is n-propylene, the amidoalkylamine surfactants are termed amidopropylamine (APA) surfactants.

Glyphosate Formulations

In various embodiments, the herbicidal formulation of this disclosure includes glyphosate and/or a salt thereof. Generally, the glyphosate loading of herbicidal compositions of the present disclosure is at least about 180 g a.e./L, at least about 220 g a.e./L, at least about 260 g a.e./L, at least about 300 g a.e./L, at least about 320 g a.e./L, at least about 360 g a.e./L, at least about 400 g a.e./L, at least about 480 g a.e./L, at least about 500 g a.e./L, at least about 540 g a.e./L, or at least about 600 g a.e./L. As indicated above, ultrahigh loadings of glyphosate or a glyphosate salt are made possible using the epoxidized oil-based surfactant, i.e., loadings of glyphosate or a glyphosate salt of at least 540 g a.e./L, although less than ultrahigh loading remains possible if desired. In various non-limiting embodiments, it is expressly contemplated herein that all values and ranges of values, both whole and fractional, including and between each value described above can be utilized.

For example, a typical stable liquid glyphosate formulation of the disclosure has a concentration of glyphosate in the range of from about 360 to about 600 g a.e./L, typically from about 450 to about 580 g a.e./L. Generally, these formulations include glyphosate (a.e.) at a concentration of from about 1 to about 65 wt. % or from about 1 to about 60 wt. %. Typically, these formulations include glyphosate (a.e.) at a concentration of from about 15 to about 50 wt. % or from about 25 to about 50 wt. %. In various non-limiting embodiments, it is expressly contemplated herein that all values and ranges of values, both whole and fractional, including and between each value described above can be utilized.

Generally, stable liquid glyphosate formulations include one or more epoxidized oil-based surfactants at a concentration of from about 1 to about 25 wt. %, typically from about 1 to about 20 wt. % and, more typically, from about 5 to about 15 wt. %. In various non-limiting embodiments, it is expressly contemplated herein that all values and ranges of values, both whole and fractional, including and between each value described above can be utilized.

Generally, the weight ratio of glyphosate (a.e.) to epoxidized oil-based surfactant of the present disclosure is from about 1:1 to about 100:1, or from about 1:1 to about 50:1. In various embodiments, the weight ratio of these components is from about 1:1 to about 30:1 or from about 1:1 to about 20:1. Typically, the weight ratio of glyphosate (a.e.) to the total proportion of epoxidized oil-based surfactant of the disclosure is between about 1:1 and about 30:1 or between about 2:1 and about 25:1 (e.g., typically between about 2.5:1 and about 20:1, between about 1:1 and about 15:1, between about 2:1 and about 10:1, between about 3:1 and about 15:1, or between about 3.5:1 and about 8:1). In various typical embodiments, the weight ratio of these components is from about 1:1 to about 15:1, more typically from about 1:1 to about 10:1 and, still more typically, from about 1:1 to about 8:1 (e.g., from about 1:1 to about 6:1, or from about 1:1 to about 4:1). In various other typical embodiments, the weight ratio of glyphosate (a.e.) to total proportion of epoxidized oil-based surfactant is from about 3:1 to about 5:1, or from about 3:1 to about 4:1. In various typical embodiments, the concentration of glyphosate is in the range of from about 360 to about 600 g a.e./L, and the weight ratio of glyphosate (wt. % a.e.) to the epoxidized oil-based surfactant of the present disclosure is between about 2:1 and about 25:1 (e.g., between about 2.5:1 and about 20:1, or between about 3.5:1 and about 8:1). In various non-limiting embodiments, it is expressly contemplated herein that all values and ranges of values, both whole and fractional, including and between each value described above can be utilized.

Along with the glyphosate and/or the salt thereof, the compositions of the present disclosure can include another surfactant such as those described herein.

Compositions of the present disclosure including one or more epoxidized oil-based surfactant of along with one or more other optional surfactants also typically include various other conventional components such as, for example, anti-foaming agents and dyes. These components generally individually or in combination include from about 0.1 to about 5 wt. % or from about 0.1 to about 2 wt. % of the formulation. The balance of these formulations is water. In various non-limiting embodiments, it is expressly contemplated herein that all values and ranges of values, both whole and fractional, including and between each value described above can be utilized.

Various other embodiments of the present disclosure are directed to solid (i.e., dry) herbicidal formulations including glyphosate or a salt thereof, optionally along with one or more other active ingredients. These other active ingredients include those generally known in the art including, for example, coherbicides, fungicides, and plant health agents such as those listed elsewhere herein. An herbicidal composition of the disclosure can optionally include other additives such as ammonium sulfate, potassium sulfate, potassium chloride, sodium sulfate, urea, glycerol, glycols, polyglycols, or mixtures thereof. Generally, any second active agent includes from about 5 to about 90 wt. % or from about 5 to about 50 wt. % of the composition. Typically, the second active agent includes from about 5 to about 35 wt. % and, still more typically, from about 10 to about 30 wt. % of the composition. Further in accordance with those embodiments including glyphosate and a second active agent, the weight ratio of glyphosate to second active agent generally is from about 1:1 to about 10:1, from about 1:1 to about 6:1, or from about 2:1 to about 6:1. In various non-limiting embodiments, it is expressly contemplated herein that all values and ranges of values, both whole and fractional, including and between each value described above can be utilized.

The present disclosure encompasses not merely formulations of glyphosate, but also relates to other herbicidal compositions comprising at least one co-herbicidal active, and at least one surfactant, wherein the at least one surfactant includes the surfactants of the disclosure. The present disclosure also encompasses herbicidal formulations comprising herbicidal actives other than glyphosate including, for example, 2,4-dichlorophenoxyacetic acid (2,4-D), dicamba, and glufosinate.

In one embodiment, the herbicidal composition does not include any additional co-herbicide besides the glyphosate or salt thereof.

In another embodiment, the herbicidal composition includes at least one co-herbicide besides the glyphosate or salt thereof.

Regardless of the particular co-herbicide or combination of co-herbicides present in the formulation, the weight ratio of glyphosate (a.e.) to one or more co-herbicides is typically from about 9:1 to 1:9, more typically 5:1 to 1:5, or 2:1 to 1:2. In various non-limiting embodiments, it is expressly contemplated herein that all values and ranges of values, both whole and fractional, including and between each value described above can be utilized.

Formulations of the present disclosure may generally be prepared by mixing the glyphosate salt solution, prepared as outlined above, together with other ingredients in a suitable mixing vessel with agitation, such as a blender. Various embodiments of the present disclosure are directed to aqueous concentrate compositions including glyphosate along with one or more epoxidized oil-based surfactant. An herbicidal concentrate of the present disclosure may be prepared by combining the required amounts of glyphosate, water, surfactant, etc., with mixing using a mechanical stirrer or any other suitable device producing the necessary amount of agitation or circulation to thoroughly mix the ingredients. The order of addition of the starting materials is not narrowly critical to the stability of the final concentrate.

A solid concentrate of the present disclosure may also be prepared by combining the required amounts of glyphosate, surfactant, etc. using a mechanical stirrer, ball milling, or any other suitable device producing the necessary amount of agitation or circulation to thoroughly mix the ingredients. The order of addition of the materials to prepare the solid concentrate is not narrowly critical to the stability of the final concentrate.

Compositions of the present disclosure can be ready for use (i.e., RTU compositions) and can be prepared by diluting an aqueous herbicidal concentrate or dissolving a solid concentrate with an appropriate amount of water.

The present disclosure is also directed to a method for killing or controlling weeds or other unwanted plants by spraying or otherwise applying a herbicidally effective amount of the RTU or diluted concentrate formulations described herein to the foliage of the plants to be treated. The herbicidal spray compositions included in the present disclosure can be applied to the foliage of the plants to be treated through any of the appropriate methods that are well known to those having skill in the art. In some embodiments, the RTU composition is packaged in a portable container suitable for hand carry by the user and fitted with an apparatus for manually releasing the composition from the container onto the foliage of the plants to be treated in the form of a spray.

The compositions of the present disclosure can be used to kill or control the growth of a wide variety of plants.

Generally, various embodiments of the present disclosure are directed to methods for controlling unwanted vegetation comprising applying an effective amount of the herbicidal formulation to the unwanted vegetation. The glyphosate formulation of the disclosure should be applied to plant foliage at an application rate sufficient to give the desired effect. Application rates are usually expressed as amount of glyphosate ae per unit area of land treated, e.g. grams ae per hectare (g a.e./ha). Suitable herbicidally efficacious application or spray rates used in the practice of the present disclosure will vary depending on the particular composition and concentration of active ingredients, the desired effects, plant species treated, weather and other factors. What constitutes a "desired effect" varies of the standards and practice of those who investigate, develop, market, and use glyphosate products. For example, the amount of glyphosate a.e. applied per unit area to give, consistently and reliably, at least 70%, more typically at least 85% control of a plant species as measured by growth reduction or mortality is often used to define a commercially effective rate.

Typical compositions of the disclosure provide equivalent herbicidal efficacy by comparison with commercial standard formulations of glyphosate. "Herbicidal efficacy," as used herein, refers to any observable measure of control of plant growth, which can include one or more of the actions of (1) killing, (2) inhibiting growth, reproduction or proliferation, and (3) removing, destroying, or otherwise diminishing the occurrence and activity of plants.

The selection of application rates that are biologically effective for a specific glyphosate formulation, such as a formulation of the present disclosure, is within the skill of the ordinary agricultural scientist. Those skilled in the art will likewise recognize that individual plant conditions, weather, and growing conditions, as well as the specific formulation selected, will influence the degree of biological effectiveness achieved in practicing this disclosure. Useful application rates can therefore depend upon all of the above conditions. Much information is known about appropriate application rates for glyphosate formulations in general. Over two decades of glyphosate use and published studies relating to such use have provided abundant information from which a weed control practitioner can select glyphosate application rates that are herbicidally effective on particular species at particular growth stages in particular environmental conditions.

Various application methods may be employed including broadcast spraying, directed spraying or wiping the foliage with a diluted composition of this disclosure. Depending on the degree of control desired, the age and species of the plants, weather conditions and other factors, typically the glyphosate application rate is an herbicidally effective amount of about 0.1 to about 10 kg a.e./ha and typically from about 0.25 to about 2.5 kg a.e./ha, although greater or lesser amounts may be applied. In various non-limiting embodiments, it is expressly contemplated herein that all values and ranges of values, both whole and fractional, including and between each value described above can be utilized.

As noted, the formulation may include a glyphosate salt such as ammonium glyphosate, diammonium glyphosate, sodium glyphosate, potassium glyphosate, isopropylammonium glyphosate, and combinations thereof. Other suitable glyphosate salts include the monoethanolamine (MEA), diethanolamine (DEA), triethanolamine (TEA), trimesium (TMS) salts, and combinations thereof.

In various embodiments, the herbicidal composition is free of a surfactant different from the epoxidized oil-based surfactant. Alternatively, the herbicidal composition may include at least one co-surfactant different from the epoxidized oil-based surfactant. Moreover, the herbicidal composition may be free of an herbicidally active ingredient apart from the glyphosate or salt thereof. Moreover, the herbicidal composition may further include at least one additional herbicidally active ingredient including, but not limited to, 2,4-dichlorophenoxyacetic acid (2,4-D), dicamba, glufosinate, and combinations thereof.

In other embodiments, the at least one additional herbicidally active ingredient is present in an amount of from about 0.25 to about 1.0 wt % based on a total weight of the herbicidal composition. In another embodiment, the at least one additional herbicidally active ingredient is present in an amount of from about 0.5 to about 1.0 wt % based on a total weight of the herbicidal composition. Moreover, the weight ratio of glyphosate (a.e.) to the at least one additional herbicidally active ingredient may be from about 0.5 to about 4.0 or from about 1.0 to about 2.0. In other embodiments, the herbicidal composition has a pH greater than about 4, greater than about 4.6, greater than about 4.7, greater than about 4.8, or greater than about 4.9. In various non-limiting embodiments, it is expressly contemplated herein that all values and ranges of values, both whole and fractional, including and between each value described above can be utilized.

Additional Embodiments

In other embodiments, the herbicidal composition includes the glyphosate salt. The glyphosate salt may be chosen from sodium, potassium, ammonium, isopropylamine, monoethanolamine, diethanolamine, triethanolamine, trimesium salts, and mixtures thereof. Alternatively, the glyphosate salt may be chosen from ammonium glyphosate, diammonium glyphosate, sodium glyphosate, potassium glyphosate, isopropylammonium glyphosate, and the monoethanolamine salt of glyphosate. In one embodiment, the glyphosate salt is ammonium glyphosate. In another embodiment, the glyphosate salt is potassium glyphosate. In another embodiment, the glyphosate salt is isopropylammonium glyphosate. In a further embodiment, the glyphosate salt is the monoethanolamine salt of glyphosate. In still another embodiment, the herbicidal composition has a loading of glyphosate or a salt thereof of at least 500 g a.e./L. In still another embodiment, the herbicidal composition has a loading of glyphosate or a salt thereof of at least 540 g a.e./L. In still another embodiment, the herbicidal composition has a loading of glyphosate or a salt thereof of at least 600 g a.e./L. In various non-limiting embodiments, it is expressly contemplated herein that all values and ranges of values, both whole and fractional, including and between each value described above can be utilized.

Cleaning Compositions

This disclosure also provides a cleaning composition. The cleaning composition may include any one or more than one of the aforementioned surfactants. Moreover, the cleaning composition may be, include, consist essentially of, or consist of, any one or more than one of the aforementioned surfactants and may optionally include, or be free of, any one or more of the aforementioned additives, additional components, co-surfactants, etc.

In one embodiment, the disclosure provides a cleaning composition for the cleaning of hard surfaces, wherein the cleaning composition includes the epoxidized oil-based surfactant. This composition may also include or be free of a chelating agent. The chelating agent is not particularly limited and may be any known in the art. In various embodiments, the chelating agent is chosen from sodium pyrophosphate, sodium tripolyphosphate and the corresponding potassium salts, organic phosphates, aminocarboxylates, aminopolyphosphonates, polyphosphonic acids, polycarboxylates, alkali salts of gluconic acid, alkali salts of glucoheptonic acid and mixtures thereof.

In one embodiment, the cleaning composition further comprises another surfactant chosen from a nonionic, anionic, cationic, or amphoteric surfactants, or combinations thereof. In one embodiment, the nonionic surfactant is an alcohol ethoxylate degreaser. In one embodiment, the cationic surfactant is a quaternary surfactant. The cleaning composition may also include additives such as a chelating agent, a base such as sodium hydroxide, a defoamer, and/or a biocide/preservative.

Additional Descriptions:

In various non-limiting embodiments, the following definitions may apply.

The term "acyl group" as used herein means the remaining structure after a hydroxyl group is removed from a carboxyl group. For example, considering the acid R—COOH, the acyl group resulting from the removal of the hydroxyl group would be R—CO.

The term "hydrocarbyl" as used herein describes organic compounds or radicals consisting exclusively of the elements carbon and hydrogen. These moieties include alkyl, alkenyl, alkynyl, and aryl moieties. These moieties also include alkyl, alkenyl, alkynyl, and aryl moieties substituted with other aliphatic or cyclic hydrocarbon groups, such as alkaryl, alkenaryl and alkynaryl. Unless otherwise indicated, these moieties typically include 1 to 30 carbon atoms.

The term "hydrocarbylene" as used herein describes radicals joined at two ends thereof to other radicals in an organic compound, and which consist exclusively of the elements carbon and hydrogen. These moieties include alkylene, alkenylene, alkynylene, and arylene moieties. These moieties also include alkyl, alkenyl, alkynyl, and aryl moieties substituted with other aliphatic or cyclic hydrocarbon groups, such as alkaryl, alkenaryl and alkynaryl. Unless otherwise indicated, these moieties typically include 1 to 30 carbon atoms. In various non-limiting embodiments, it is expressly contemplated herein that all values and ranges of values including and between each value described above can be utilized.

The term "substituted hydrocarbyl" as used herein describes hydrocarbyl moieties that are substituted with at least one atom other than carbon, including moieties in which a carbon chain atom is substituted with a hetero atom such as nitrogen, oxygen, silicon, phosphorous, boron, sulfur, or a halogen atom. These substituents include halogen, heterocyclo, alkoxy, alkenoxy, alkynoxy, aryloxy, hydroxy, protected hydroxy, ketal, acyl, acyloxy, nitro, amino, amido, cyano, thiol, acetal, sulfoxide, ester, thioester, ether, thioether, hydroxyalkyl, urea, guanidine, amidine, phosphate, amine oxide, and quaternary ammonium salt.

The "substituted hydrocarbylene" moieties described herein are hydrocarbylene moieties which are substituted with at least one atom other than carbon, including moieties in which a carbon chain atom is substituted with a hetero atom such as nitrogen, oxygen, silicon, phosphorous, boron, sulfur, or a halogen atom. These substituents include halogen, heterocyclo, alkoxy, alkenoxy, alkynoxy, aryloxy, hydroxy, protected hydroxy, ketal, acyl, acyloxy, nitro, amino, amido, cyano, thiol, acetal, sulfoxide, ester, thioester, ether, thioether, hydroxyalkyl, urea, guanidine, amidine, phosphate, amine oxide, and quaternary ammonium salt.

Unless otherwise indicated, the alkyl groups described herein are typically lower alkyl including from 1 to 18 carbon atoms in the principal chain and up to 30 carbon atoms. They may be straight or branched chain or cyclic and include methyl, ethyl, propyl, isopropyl, n-butyl, isobutyl, hexyl, 2-ethylhexyl, and the like. In various non-limiting embodiments, it is expressly contemplated herein that all values and ranges of values including and between each value described above can be utilized.

Unless otherwise indicated, the alkenyl groups described herein are typically lower alkenyl including from 2 to 18 carbon atoms in the principal chain and up to 30 carbon atoms. They may be straight or branched chain or cyclic and include ethenyl, propenyl, isopropenyl, butenyl, isobutenyl, hexenyl, and the like. Unless otherwise indicated, the alkynyl groups described herein are typically lower alkynyl including from 2 to 18 carbon atoms in the principal chain and up to 30 carbon atoms. They may be straight or branched chain and include ethynyl, propynyl, butynyl, isobutynyl, hexynyl, and the like. The term "aryl" as used herein alone or as part of another group denote optionally substituted homocyclic aromatic groups, typically monocyclic or bicyclic groups including from 6 to 12 carbons in the ring portion, such as phenyl, biphenyl, naphthyl, substituted phenyl, substituted biphenyl or substituted naphthyl. Phenyl and substituted phenyl are the more typical aryl. In various non-limiting embodiments, it is expressly contemplated herein that all values and ranges of values including and between each value described above can be utilized.

The term "aralkyl" as used herein denotes a group including both alkyl and aryl structures such as benzyl.

As used herein, the alkyl, alkenyl, alkynyl, aryl and aralkyl groups can be substituted with at least one atom other than carbon, including moieties in which a carbon chain atom is substituted with a hetero atom such as nitrogen, oxygen, silicon, phosphorous, boron, sulfur, or a halogen atom. These substituents include hydroxy, nitro, amino, amido, nitro, cyano, sulfoxide, thiol, thioester, thioether, ester and ether, or any other substituent which can increase the compatibility of the surfactant and/or its efficacy enhancement in the potassium glyphosate formulation without adversely affecting the storage stability of the formulation.

The terms "halogen" or "halo" as used herein alone or as part of another group refer to chlorine, bromine, fluorine, and iodine. Fluorine substituents are often typical in surfactant compounds.

The term "cyclic" as used herein alone or as part of another group denotes a group having at least one closed ring, and includes alicyclic, aromatic (arene) and heterocyclic groups.

The term "alkanol" as used herein alone or as part of another group denotes a straight or branched alkyl chain substituted by one or more hydroxyl groups.

The term "ether-alkanol" as used herein alone or as part of another group denotes an alkanol group as defined above interrupted in the straight or branched alkyl chain by an oxygen atom resulting in an "ether (C—O—C) linkage" or joined at one of its carbon atoms via an oxygen atom to a carbon atom of another portion of the molecule. For example, in maltose both (1) the ring oxygen atoms and (2) the oxygen atoms connecting the two glucose units would be considered to be ether linkages; and the maltose residue thus an ether alkanol. The term "ether-alkanol" is broad enough to embrace acetals, hemiacetals, or hemiketals.

EXAMPLES

Various non-limiting embodiments of the present disclosure are illustrated by the Examples set forth below.

Set 1—Examples

| Description | Solvent | % Active |
|---|---|---|
| Epoxidized Soybean Oil (ESBO) (53%) + Diethanolamine (46%) (Molar Ratio = 1:9) | None | 100% |
| ESBO (46.4%) + Diethanolamine (25.4%) + NMG (28.2%) (1:5:3) | None | 100% |
| ESBO (50.8%) + Diethanolamine (38.9%) + NMG (10.3%) (1:1:7) | None | 100% |
| ESBO (53.4%) + Diethanolamine (46.6%) (1:8) | None | 100% |
| ESBO (48.5%) + NMG (19.7%) + Diethanolamine (31.8%) (1:2:6) | None | 100% |
| ESBO (44.5%) + NMG (36.1%) + Diethanolamine (19.4%) (1:4:4) | None | 100% |

-continued

| Description | Solvent | % Active |
|---|---|---|
| Epoxidized Linseed Oil (42.4%) + Diethanolamine (23.3%) + NMG (34.4%) (1:5:4) | None | 100% |
| Epoxidized Propylene Glycol dioleate (51.5%) + Diethanolamine (17%) + NMG (31.5%) (1:2:2) | None | 100% |

The reactions set forth above are carried out under standard synthesis conditions well known to those of skill in the art. This data demonstrates that these reactions were successful such that the resulting compounds can be used in various non-limiting embodiments of this disclosure.

Set 2—Examples

Sugar Surfactants (Adjuvants)

| | Raw-Material mol ratio | | | | |
|---|---|---|---|---|---|
| Lot No. | ESBO | ELO | EPGD | DEA | NMG |
| 2837-41 | 1 | | | 9 | 0 |
| 2837-46 | 1 | | | 8 | 0 |
| 2837-45 | 1 | | | 7 | 1 |
| 2837-47 | 1 | | | 6 | 2 |
| 2837-44 | 1 | | | 5 | 3 |
| 2837-58 | 1 | | | 4 | 4 |
| 2873-73 | | 1 | | 5 | 4 |
| 2873-75 | | | 1 | 2 | 2 |

wherein ESBO is Epoxidized Soybean Oil; ELO is Epoxidized Linseed Oil; EPGD is Epoxidized propylene glycol dioleate; DEA is Diethanol amine; and NMG is N-methyl Glucamine The data set forth above demonstrates that there are up to 9 reaction sites for ESBO when reacting with an amine. However, when a different epoxidized oil such as ELO is used, this number may be less. Accordingly, any and all ratios of reactants are hereby expressly contemplated for use herein so long as the total does not exceed the number of reaction sites of the epoxidized oil, as is understood by those of skill in the art.

Set 3—Examples

Glyphosate Blends**

| | Lot No. | Weight % in Formulation | | | | Cloud |
|---|---|---|---|---|---|---|
| Formulation # | Sugar Surfactants | K-glyphosate* | water | Sugar Surfactants | APA-7# | point 0° C. |
| 2814-31-1 | 2837-41 | 82.2 | 7.8 | 10 | 0 | Hazy |
| 2814-31-2 | 2837-46 | 82.2 | 7.8 | 10 | 0 | Hazy |
| 2814-31-3 | 2837-45 | 82.2 | 7.8 | 10 | 0 | Hazy |
| 2814-31-4 | 2837-47 | 82.2 | 7.8 | 10 | 0 | Hazy |
| 2814-31-5 | 2837-44 | 82.2 | 7.8 | 10 | 0 | Hazy |
| 2814-31-7 | 2837-58 | 82.2 | 7.8 | 10 | 0 | Hazy |
| 2814-31-10 | 2873-73 | 82.2 | 7.8 | 10 | 0 | Hazy |
| 2814-31-1a | 2837-41 | 82.2 | 7.8 | 5.9 | 4.1 | 65 |
| 2814-31-2a | 2837-46 | 82.2 | 7.8 | 6.3 | 3.8 | 55 |
| 2814-31-3a | 2837-45 | 82.2 | 7.8 | 6.7 | 3.3 | 78 |
| 2814-31-4a | 2837-47 | 82.2 | 7.8 | 6.5 | 3.5 | >80 |

-continued

Glyphosate Blends**

| | Lot No. | Weight % in Formulation | | | | Cloud |
|---|---|---|---|---|---|---|
| Formulation # | Sugar Surfactants | K-glyphosate* | water | Sugar Surfactants | APA-7# | point 0° C. |
| 2814-31-5a | 2837-44 | 82.2 | 7.8 | 7.4 | 2.6 | >80 |
| 2814-31-7a | 2837-58 | 82.2 | 7.8 | 9.1 | 0.9 | >80 |
| 2814-31-10a | 2873-73 | 82.2 | 7.8 | 9.1 | 0.9 | >80 |
| 2814-31-11 | 2873-75 | 82.2 | 7.8 | 10 | 0 | >80 |

*K-Glyphosate used is 48.2% ae
**Represents 540 g of ae/L of K-Glyphosate
#APA-7 C7-DMAPA amide The results set forth above show that, at a particular high loading of a particular glyphosate salt, the APA-7 co-surfactant was required. However, it is also discovered that other glyphosate salts and/or lower loadings of the aforementioned glyphosate salt can be used to form a composition that has a desirable cloud point and that is not hazy.

While the present disclosure has been described in conjunction with the specific embodiments set forth above, many alternatives, modifications and other variations thereof will be apparent to those of ordinary skill in the art. All such alternatives, modifications and variations are intended to fall within the spirit and scope of the present disclosure.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the various embodiments in any way. Rather, the foregoing detailed description will provide those skilled in the art with a convenient road map for implementing an exemplary embodiment as contemplated herein. It being understood that various changes may be made in the function and arrangement of elements described in an exemplary embodiment without departing from the scope of the various embodiments as set forth in the appended claims.

What is claimed is:

1. An epoxidized oil-based surfactant that is the reaction product of epoxidized soybean oil, diethanolamine, and n-methylglucamine, wherein the epoxidized soybean oil has the following structure (I):

(I)

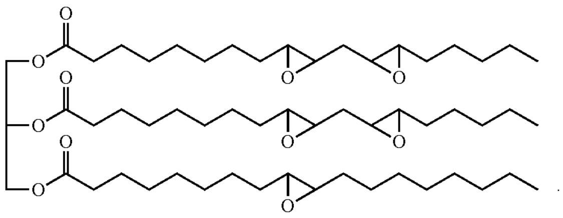

and wherein the molar ratio of epoxidized soybean oil: diethanolamine;n-methylglucamine is 1:(1-5):(3-7).

2. A surfactant composition comprising the epoxidized oil-based surfactant of claim 1 and at least one co-surfactant different from the epoxidized oil-based surfactant.

3. An herbicidal composition comprising glyphosate or a salt thereof and at least one epoxidized oil-based surfactant of claim 1.

4. The herbicidal composition of claim 3 that is free of surfactants that are not the epoxidized oil-based surfactant.

5. The herbicidal composition of claim 4 comprising at least one herbicidally active ingredient in addition to the glyphosate or salt thereof.

6. The herbicidal composition of claim 5 wherein the additional herbicidally active ingredient is chosen from 2,4-dichlorophenoxyacetic acid (2,4-D), dicamba, glufosinate, and combinations thereof.

7. The herbicidal composition of claim 4 wherein the glyphosate salt is chosen from sodium, potassium, ammonium, isopropylamine, monoethanolamine, diethanolamine, triethanolamine, trimesium salts, and combinations thereof.

8. The herbicidal composition of claim 4 which has loading of glyphosate or a salt thereof of at least 540 g a.e./L.

9. A method of controlling unwanted vegetation, said method comprising applying a herbicidally effective amount of an herbicidal composition of claim 4 to the unwanted vegetation.

10. A method of preparing the epoxidized oil-based surfactant of claim 1, said method comprising the step of reacting the epoxidized soybean oil, the diethanolamine, and the n-methylglucamine.

11. A cleaning composition for the cleaning of hard surfaces, said cleaning composition comprising:

the epoxidized oil-based surfactant of claim 1; and an additional component chosen from an additional surfactant and/or a chelating agent.

12. The cleaning composition of claim 11 wherein the chelating agent is chosen from sodium pyrophosphate, sodium tripolyphosphate and the corresponding potassium salts, organic phosphates, aminocarboxylates, aminopolyphosphonates, polyphosphonic acids, polycarboxylates, alkali salts of gluconic acid, alkali salts of glucoheptonic acid and mixtures thereof.

13. The cleaning composition of claim 12 wherein the additional surfactant is chosen from anionic, cationic, or amphoteric surfactants, or combinations thereof.

14. The cleaning composition claim 12 further comprising an alkali hydroxide, an alkaline builder, an alkaline complexing agent, or combinations thereof.

15. The surfactant of claim 1 wherein the molar ratio of epoxidized soybean oil: diethanolamine: n-methylglucamine is 1:5:3.

16. The surfactant of claim 1 wherein the molar ratio of epoxidized soybean oil: diethanolamine: n-methylglucamine is 1:1:7.

17. The surfactant of claim 1 wherein the molar ratio of epoxidized soybean oil: diethanolamine: n-methylglucamine is 1:2:6.

18. The surfactant of claim 1 wherein the molar ratio of epoxidized soybean oil: diethanolamine: n-methylglucamine is 1:4:4.

* * * * *